United States Patent Office 3,534,004
Patented Oct. 13, 1970

3,534,004
POLYMERIC COMPOSITIONS OF MATTER
John P. Luvisi, Park Ridge, Ill., assignor to Universal Oil Products Company, Des Plaines, Ill., a corporation of Delaware
No Drawing. Continuation-in-part of application Ser. No. 411,546, Nov. 16, 1964. This application Nov. 29, 1968, Ser. No. 780,224
Int. Cl. C08f 3/42
U.S. Cl. 260—78.5     14 Claims

ABSTRACT OF THE DISCLOSURE

Novel compositions of matter can be prepared by reacting a polymeric compound which contains at least one active hydrogen atom with a halo-substituted polycyclic epoxide. The halo-substituted polycyclic epoxides can be prepared by reacting an unsaturated 1,2-epoxide with a halogen-containing conjugated diene or by condensing an unsaturated 1,2-epoxide with a conjugated diene and reacting the resulting condensate with a polyhalocycloalkadiene. The novel compositions of matter will possess flame-resistant or flame-retardant properties.

---

This application is a continuation-in-part of my copending application, Ser. No. 411,546, filed Nov. 16, 1964, now abandoned.

This invention relates to novel compositions of matter and more particularly to polymeric compositions of matter containing, as one component thereof, a halo-substituted polycyclic epoxide.

The novel compositions of matter of the present invention which are prepared according to a process hereinafter set forth in greater detail and which comprise the reaction product of a polymeric compound which contains at least one active hydrogen atom and a halo-substituted polycyclic epoxide will possess many particular and desirable physical characteristics which will make these compounds commercially attractive for various and sundry articles of commerce. For example, the finished compositions of matter which may be prepared by reacting a polymer containing at least one active hydrogen atom with a halo-substituted polycyclic epoxide of the type hereinafter set forth in greater detail will possess flame-resistant or fire-retardant properties. This property is especially advantageous when preparing resins or plastic materials which will be utilized in places which may be subject to excessive heat or possible flame such as architectural paneling for construction work, wall plugs for electrical connections, bodies for airplanes, bodies for automobiles, bodies for boats, as protective coatings, etc. In addition, the halo-substituted polycyclic epoxides, due to their stability and resistance to deterioration, will make the epoxide an attractive constituent of plastic materials or resins which are colorless and should remain so or which are colored and will not darken, lighten or turn another color.

It is therefore an object of this invention to provide novel compositions of matter which possess the desirable properties of flame retardancy and high color stability.

Another object of this invention is to provide novel compositions of matter which are prepared by reacting certain polymeric compounds containing at least one active hydrogen atom with halo-substituted polycyclic epoxides to prepare finished polymeric compositions of matter possessing valuable physical properties.

In a broad aspect an embodiment of this invention is found in a composition of matter comprising the reaction product of a polymeric compound which contains at least one active hydrogen atom and a halo-substituted polycyclic epoxide, said epoxide being reacted with said polymeric compound in an amount of from about 5% to about 50% by weight of the finished product at a temperature in the range of from about 100° to about 250° C.

A specific embodiment of this invention resides in a composition of matter comprising the reaction product of polymethacrylic acid and 5-epoxyethyl-1,2,3,4,7,7-hexachloro-2-norbornene.

Other objects and embodiments will be found in the following further detailed description of the present invention.

As hereinbefore set forth, it has now been discovered that novel compositions of matter, which are polymeric in nature and possess the desirable physical characteristics of flame retardancy and color stability, may be prepared by reacting a compound which is polymeric in nature, and which must contain at least one active hydrogen atom, with a halo-substituted polycyclic epoxide, the latter compound also acting as a plasticizer or cross-linking agent in addition to imparting the aforementioned desirable physical characteristics to the finished product. In addition to imparting the desirable characteristics of flame retardancy and color stability, it is also contemplated within the scope of this invention that the halo-substituted polycyclic epoxides will impart other desirable characteristics such as lubricating, anti-slip, anti-block, anti-static, etc. properties to the finished product.

Examples of polymeric compounds which contain at least one active or reactive hydrogen atom which are reacted with the halo-substituted polycyclic epoxides will include polymers of the acrylic acid series such as a polymeric acrylic acid, a polymeric methacrylic acid, a polymeric crotonic acid, a polymeric alpha-ethylacrylic acid, a polymeric alpha-propylacrylic acid, etc.; co-polymers of these acids such as co-polymers of acrylic acid and methacrylic acid, co-polymers of acrylic acid and crotonic acid, co-polymers of methacrylic acid and crotonic acid, etc.; co-polymers of the acrylic acids and vinyl monomers such as acrylic acid and vinyl acetate, acrylic acid and vinyl propionate, acrylic acid and vinyl butyrate, acrylic acid and vinyl chloride, acrylic acid and styrene, acrylic acid and vinyl allyl ether, methacrylic acid and vinyl acetate, methacrylic acid and vinyl propionate, methacrylic acid and vinyl butyrate, methacrylic acid and vinyl chloride, methacrylic acid and styrene, methacrylic acid and vinyl allyl ether, etc.; co-polymers of acrylic acids and dienes such as acrylic acid and butadiene, acrylic acid and isoprene, acrylic acid and pentadiene, acrylic acid and hexadiene, methacrylic acid and butadiene, methacrylic acid and isoprene, methacrylic acid and pentadiene, methacrylic acid and hexadiene, crotonic acid and butadiene, crotonic acid and isoprene, crotonic acid and pentadiene, crotonic acid and hexadiene, etc.; the co-polymer of an unsaturated dicarboxylic acid or anhydride thereof and vinyl esters such as the co-polymer of maleic anhydride and vinyl acetate, the co-polymer of maleic anhydride and vinyl propionate, the co-polymer of maleic anhydride and olefins such as maleic anhydride and butadiene, maleic anhydride and isoprene, maleic anhydride and pentadiene, etc.; polymers of vinyl alcohols, polymers of cellulosic triacetate, amine polymers such as ethyleneimine polymers, propyleneimine polymers, butyleneimine polymers, etc. In the preferred embodiment of the present invention the polymeric compound which contains at least one active hydrogen atom comprises the polymer or copolymer of the acrylic acid series, although the present invention is not necessarily limited thereto. The polymers which result from the polymerization of the acrylic acid series, for example, will range from soft, sticky, semi-fluid materials to hard solids and will find a wide variety of uses in modern industry. Some of the uses to which these resins or plastics may be put after treatment with another compound to form the desired finished product include aircraft canopies and windows, atuomotive instrument dials, horn buttons, lighting fixtures, refrigerator parts, surgical instruments, safety glass, protective coatings including lacquer paints and finishes, textile and leather finishes and coatings, adhesives, etc. In many instances the finished use for which these products are to be put would require some degree of flame resistance or flame retardancy, these properties being incorporated into the final product by treating the polymer with the halo-substituted polycyclic epoxide.

The halo-substituted polycyclic epoxide which is reacted with the aforementioned polymeric compound containing at least one active hydrogen atom may be prepared by condensing an unsaturated 1,2-epoxide (the 1,2-designation indicating that the hydrocarbon is attached to adjacent carbon atoms) with an aliphatic or cyclic dienic hydrocarbon. Typical specific compounds of the unsaturated 1,2-epoxides include 3,4-epoxy-1-butene (butadiene monoxide), 3,4-epoxy-2-methyl-1-butene, 3,4-epoxy-2-ethyl-1-butene, 4,5-epoxy-2-pentene, 4,5-epoxy-1-pentene, 1,2-epoxy-3-hexene, 3,4-epoxy-1-hexene, etc., 3,4-epoxy-1-cyclohexene, 4,5-epoxy-1-cyclohexene, etc., 1-vinyl-1,2-epoxycyclohexene, 3-(epoxyethyl)cyclohexene, 5,6-epoxy-1,3-hexadiene, etc. Generically speaking, the unsaturated epoxides may be selected from both the aliphatic and naphthenic mono- and poly-olefinic series including particularly, the 1,2-epoxides having the formula:

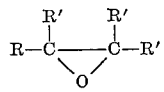

in which R is an aliphatic, cyclic, bicyclic or polycyclic hydrocarbon radical containing at least one non-aromatic double bond and R′ is selected from the group consisting of hydrogen, alkyl, cycloalkyl, bicycloalkyl and aryl radicals. The unsaturated 1,2-epoxide is condensed with a conjugated aliphatic or cyclic diene which may contain halogen substituents if so desired. Examples of these conjugated aliphatic and cyclic dienes which may be used in this reaction include 1,3-butadiene, 1,3-pentadiene, 2,4-pentadiene, etc., 1,3-cyclopentadiene (usually referred to as cyclopentadiene), 1,3-cyclohexadiene, 5-chlorocyclopentadiene, 5,5-dichlorocyclopentadiene, 1,2,4-trichlorocyclopentadiene, 1,5,5-trichlorocyclopentadiene, 1,4,5,5-tetrachlorocyclopentadiene, 1,2,3,4,5 - pentachlorocyclopentadiene, hexachlorocyclopentadiene, etc. It is to be understood that the aforementioned compounds are only representative of the class of compounds which may be used and that the present invention is not necessarily limited thereto.

The preparation of the halo-substituted polycyclic epoxide which constitutes one of the starting materials utilized in the preparation of the novel compositions of matter of the present invention comprises the condensation of an unsaturated 1,2-epoxide with a conjugated aliphatic or cyclic diene. This condensation is effected at temperatures ranging from about 50° up to about 250° C. and preferably within a range of about 80° to about 200° C. In addition, the reaction will proceed at pressures ranging from atmospheric to about 100 atmospheres or more, the preferred range being from about 1 to about 75 atmospheres. The aforementioned reaction conditions under which the condensation is effected will depend largely uopn the particular reactants undergoing reaction and will be within the range necessary to maintain a major portion of the reactants in the liquid phase. In addition, the proportion of aliphatic or cyclic diene to unsaturated epoxide will depend upon the particular condensation product desired. For example, when utilizing an aliphatic epoxide and the desired product is an epoxide of a tricyclic nature, the molecular proportion of conjugated cyclic diene to unsaturated epoxide will be 1:1; however, if a pentacyclic derivative is desired as the chief product, two moles of the conjugated cyclic diene will be reacted with one mole of olefinic epoxide; while if a heptacyclic epoxide is desired, three moles of conjugated cyclic diene will be reacted with one mole of olefinic epoxide. If the conjugated cyclic diene does not contain any halogen substituents, the polycyclic epoxide may be further condensed with a halo-substituted conjugated cycloalkadiene or, if so desired, it may be halogenated by any means known in the art.

The process in which the desired halo-substituted polycyclic epoxide is prepared may be effected in either a batch or continuous type operation. When a batch type operation is used, a quantity of the starting material, namely, the conjugated diene and the unsaturated 1,2-epoxide, is placed in a reaction vessel such as a rotating autoclave and reacted at elevated temperatures and superatmospheric pressures in a range hereinbefore set forth. A suitable means of effecting the aforesaid superatmospheric pressure is by the introduction of an inert gas such as nitrogen to the reaction vessel. Alternatively, the pressure may be the vapor pressure of the reactants. In addition, if so desired, the condensation may be carried out in the presence of substantially inert organic solvents including aromatic and alkylated aromatic hydrocarbons such as benzene, toluene, the xylenes, ethylbenzene, etc.; paraffinic hydrocarbons such as n-pentane, n-hexane, n-heptane, methylcyclopentane, cyclopentane, etc.; or saturated aliphatic alcohols such as ethanol, propanol, etc. The reaction vessel is heated to the desired temperature and the reaction is allowed to proceed toward completion, after which the reactor and contents thereof are allowed to cool to room temperature and the excess pressure is vented. The reaction product is then separated from the solvent and unreacted material by conventional means, for example, by fractional distillation, fractional crystallization, etc. If the conjugated diene which is utilized as a starting material does not contain any halogen substituents, the polycyclic epoxide is then further reacted with a polyhalocycloalkadiene or, if so desired, is halogenated by conventional means.

It is also contemplated that the polycyclic epoxide may also be prepared in a continuous type operation. In this method the reactants are continuously admitted by separate means or as a mixture into a reactor which is maintained at the proper operating conditions of temperature and pressure. The substantially inert organic solvent which is used is also continuously charged through a separate line or, if so desired, may be admixed with one or both of the starting materials and the mixture charged into the reactor in a single line. Upon completion of the desired residence time, the reaction product is continuously withdrawn from the reactor and separated from the unreacted starting materials and solvent, the latter two being recycled to the reactor to form a portion of the feed stock, while the desired product is separated and recovered by conventional means.

Examples of halo-substituted polycyclic epoxides which are utilized as the flame-retardant components when admixed with polymeric compounds containing at least one active hydrogen atom will include:

5-epoxyethyl-1,2,3,4,7,7-hexachloro-2-nor-bornene,
5-epoxyethyl-1,2,3,4-tetrachloro-2-norbornene,
2-epoxyethyl-5,6,7,8,9,9-hexachloro-1,2,3,4,4a,5,8,8a-octahydro-1,4,5,8-dimethanonaphthalene,
2-epoxyethyl-5,6,7,8-tetrachloro-1,2,3,4,4a,5,8,8a-octahydro-1,4,5,8-dimethanonaphthalene,
2-epoxyethyl-6,7,8,9,11,11-hexachloro-1,2,3,4,4a,5,5a,6,-9,9a,10,10a-dodecahydro-1,4,5,10,6,9-trimethanoanthracene,
2-epoxyethyl-5,6,7,8,9,9-hexachloro-1,2,3,4,4a,5,8,8a-octahydro-5,8-methanonaphthalene,
2-epoxyethyl-5,6,7,8-tetrachloro-1,2,3,4,4a,5,8,8a-octahydro-5,8-methanonaphthalene,
5-epoxyethyl-1,2,3,4,7,7-hexabromo-2-norbornene,
5-epoxyethyl-1,2,3,4-tetrabromo-2-norbornene, 2-epoxyethyl-5,6,7,8,9,9-hexabromo-1,2,3,4,4a,5,8,8a-octahydro-1,4,5,8-dimethanonaphthalene,
2-epoxyethyl-5,6,7,8-tetrabromo-1,2,3,4,4a,5,8,8a-octahydro-1,4,5,8-dimethanonaphthalene,
2-epoxyethyl-6,7,8,9,11,11-hexabromo-1,2,3,4,4a,5,5a,6,-9,9a,10,10a-dodecahydro-1,4,5,10,6,9-trimethanoanthracene,
2-epoxyethyl-5,6,7,8,9,9-hexabromo-1,2,3,4,4a,5,8,8a-octahydro-5,8-methanonaphthalene,
2-epoxyethyl-5,6,7,8-tetrabromo-1,2,3,4,4a,5,8,8a-octahydro-5,8-methanonaphthalene,
5-epoxyethyl-1,2,3,4-tetrachloro-7,7-dibromo-2-norbornene,
2-epoxyethyl-5,6,7,8-tetrachloro-9,9-dibromo-1,2,3,4,-4a,5,8,8a-octahydro-5,8-methanonaphthalene, etc.

It is to be understood that the aforementioned compounds are only representative of the class of halo-substituted polycyclic epoxides which may be prepared and utilized as components of finished compositions of matter when reacted with polymers containing at least one active hydrogen atom, and that the present invention is not necessarily limited thereto.

As hereinbefore set forth the novel compositions of matter of the present invention comprise polymeric compositions of matter which possess the desirable and attractive physical properties of being flame resistant and fire retardant and which will, in addition, also possess excellent color stability features, said polymeric compositions of matter comprising the reaction product of a polymeric compound which contains at least one active hydrogen atom and a halo-substituted polycyclic epoxide which has been prepared according to the process hereinbefore set forth. The novel compositions of matter of the present invention may be prepared by any conventional means, said means including physically admixing the components, milling, etc.

The desired product, as hereinbefore set forth, is prepared by admixing from about 5% to about 50% by weight of the finished product of the halo-substituted polycyclic epoxide with the polymeric compound such as the polymeric acrylic acid, polymeric methacrylic acid, copolymers of maleic anhydride and a vinyl ester such as vinyl acetate, etc., in a reaction vessel if the reaction proceeds in a batch type operation. The admixture of the two components may also be effected in the presence of a substantially inert organic solvent of the type hereinbefore set forth, said reaction being effected at elevated temperatures, usually ranging from about 100° up to about 250° C. or more. Upon completion of the reaction in which the halo-substituted polycyclic epoxide may act as a curing or cross-linking agent, the desired product is recovered and utilized as a coating or molded product, depending upon the nature of the initial polymer.

It is also contemplated that the preparation of the finished composition of matter may also be effected in a continuous manner of operation. When this type of operation is used, the polymer containing at least one active hydrogen atom and the halo-substituted polycyclic epoxide are continuously charged to a reaction vessel which is maintained at the proper operating conditions of temperature and pressure. The polymer and the epoxide are usually dissolved in a substantially inert organic solvent in order to facilitate the charging of the material to the reactor. Upon completion of the desired residence time, the finished compound is continuously withdrawn, separated from unreacted starting materials and solvent and recovered.

In addition, if the physical characteristics of the polymer containing at least one active hydrogen atom and the halo-substituted polycyclic epoxide will permit, the two components may be admixed in a milling operation and milled at an elevated temperature, the temperature again depending upon the particular physical characteristics of the two components, for a predetermined period of time, after which the finished product may be molded, extruded, or formed into any desired shape by any conventional means.

The following examples are given to illustrate the process of the present invention which, however, are not intended to limit the generally broad scope of the present invention in strict accordance therewith.

EXAMPLE I

A halo-substituted polycyclic epoxide is formed by mixing 50 grams of cyclopentadiene and 30 grams of butadiene monoxide at a temperature ranging from 150° to about 190° C. during a period of 4.5 hours in a glass-lined rotating autoclave of 850 cc. capacity which is placed under an initial nitrogen pressure of 50 atmospheres. At the end of the residence time, the autoclave and contents thereof are allowed to cool to room temperature, the excess pressure is vented and the autoclave is opened. The reaction product is taken up in toluene and distilled under reduced pressure. The fraction boiling at 69°–70° C. at 10 mm. pressure (or about 191°–192° C. at 760 mm. pressure) comprising 5-epoxyethyl-2-norbornene is recovered.

A mixture of 10 grams of the 5-epoxyethyl-2-norbornene and 20 grams of hexachlorocyclopentadiene along with 15 grams of toluene is heated under reflux conditions at a temperature of approximately 124° C. for a period of about 14 hours. Following this, the reaction product is subjected to fractional distillation under reduced pressure and a liquid adduct having a boiling point of 403°–406° C. at 760 mm. pressure comprising 2-epoxy-ethyl-5,6,7,8, 9,9 - hexachloro - 1,2,3,4,4a,5,8,8a - octahydro - 1,4,5,8 - dimethanonaphthalene is recovered.

A polymeric composition of matter comprising polymethacrylic acid and the polyhalo-substituted polycyclic epoxide prepared according to the above paragraphs along with a benzene solvent are placed in a reaction vessel and the resulting mixture is heated to a temperature of about 100° C. Upon completion of the desired residence time, the finished composition of matter is recovered and poured into a mold, said mold being formed by utilizing sheets of glass held apart by Teflon spacers, the distance between the glass sheets being approximately $\frac{1}{16}$ inch. The final composition of matter comprising the treated resin after curing in air at a temperature of about 100° C. for a period of about 6 hours is removed from the mold. The sheets of resin when subjected to the action of a direct flame will burn at a very slow rate and when removed from direct contact with the flame will be found to be self-extinguishing. In addition, the sheets of resin upon being subjected to the weathering action of direct sunlight will also be found to maintain a clearness and a color stability greater than that of untreated resin.

EXAMPLE II

In this example a mixture of 135 grams of hexachlorocyclopentadiene and 50 grams of butadiene monoxide is heated at a temperature ranging from about 150° to about 190° C. under an initial nitrogen pressure of 50 atmospheres in a glass-lined rotating autoclave for a period of about 5 hours. At the end of this time the autoclave and contents thereof are allowed to cool to room temperature, the excess pressure is vented and the autoclave is opened. The reaction product is taken up in toluene and thereafter subjected to fractional distillation under reduced pressure. The desired product comprising 5-epoxy-ethyl-1,2,3,4,7,7-hexachloro-2-norbornene is separated and recovered.

To obtain the desired composition of matter, a portion of polymethacrylic acid and the 5-epoxyethyl-1,2,3,4,7,7-hexachloro-2-norbornene which is prepared according to the above paragraph are placed in a reaction vessel along with a xylene solvent. The mixture is heated until the solids are dissolved and thereafter thoroughly admixed. Following this, the mixture is poured into glass molds to form resinous sheets approximately $\frac{1}{16}$ inch in thickness.

The resin is cured at a temperature of about 100° C. for a period of about 6 hours. At the end of this time the sheets are removed from the mold and subjected to the direct action of a flame. The resin will burn at a very slow rate and when removed from direct contact with the flame will be found to be self-extinguishing in nature.

EXAMPLE III

In this example a resin comprising polyacrylic acid is admixed with 5-epoxyethyl-1,2,3,4,7,7-hexachloro-2-norbornene which is prepared in a manner similar to that set forth in Example II above. The finished composition of matter comprising the reaction product of the polyacrylic acid and the halo-substituted polycyclic epoxide is cured in a manner similar to that hereinbefore set forth and the resin, when subjected to the direct action of a flame, will give similar results to those compositions of matter set forth in Examples I and II above.

EXAMPLE IV

In this example a mixture of 54 grams of 1,3-butadiene and 30 grams of butadiene monoxide is placed in the glass liner of a rotating autoclave and heated at a temperature of about 150° C. for a period of about 5 hours under an initial nitrogen pressure of 50 atmospheres. Upon completion of the desired residence time the autoclave and contents thereof are allowed to cool to room temperature, the excess pressure is vented and the autoclave is opened. The desired reaction product comprising 4-epoxyethyl-1-cyclohexene is recovered after fractional distillation under reduced pressure of the reaction product. Following this, 10 grams of the 4-epoxyethyl-1-cyclohexene and 20 grams of hexachlorocyclopentadiene are admixed along with 15 grams of toluene and the solution is heated under reflux conditions at a temperature of approximately 125° C. for a period of about 12 hours. At the end of this time the reaction product is subjected to fractional distillation under reduced pressure and the desired product comprising 2-epoxyethyl-5,6,7,8,9,9-hexachloro-1,2,3,4,4a,5,8,8a,-octahydro-5,8-methanonaphthalene is obtained.

A mixture of polyacrylic acid and the halo-substituted polycyclic epoxide prepared according to the above paragraph in a xylene solvent is heated and admixed until a homogeneous mixture is obtained. The mixture is poured into glass molds and cured at a temperature of about 100° C. for a period of about 6 hours. At the end of this time the desired composition of matter comprising the reaction product of polyacrylic acid and 2-epoxyethyl-5,6,7,8,9,9-hexachloro - 1,2,3,4,4a,5,8,8a - octahydro-5,8-methanonaphthalene is recovered and subjected to flame resistance and color stability tests. The product will exhibit excellent flame resistant or retardant and color stable properties similar in nature to those properties found in the finished compositions of matter set forth in Examples I and III above.

EXAMPLE V

In this example a halo-substituted polycyclic epoxide comprising 2 - epoxyethyl-5,6,7,8,9,9-hexachloro-1,2,3,4,-4a,5,8,8a-octahydro-1,4,5,8 - dimethanonaphthalene and a polymeric composition of matter containing at least one active hydrogen atom comprising polyethylacrylic acid are treated in a manner similar to that set forth in the above examples. The finished composition of mater comprising the reaction product of these two materials will, upon examination, be found to possess excellent fire retardant and color stable properties.

EXAMPLE VI

In this example a mixture of 50 grams of cyclopentadiene and 20 grams of butadiene monoxide is treated in a manner similar to that set forth in the above examples. The reaction product is taken up in toluene and distilled under reduced pressure, the fraction boiling at 117°–120° C. at 3 mm. pressure (about 286°–290° C. at 760 mm. pressure) being recovered. A mixture of 10 grams of this product and 20 grams of hexachlorocyclopentadiene in 15 grams of toluene is refluxed for a period of about 12 hours at 125° C. At the end of this time the reaction product is subjected to fractional distillation under reduced pressure and the desired product comprising 2-epoxyethyl-6,7,8,9,-11,11 - hexachloro - 1,2,3,4,4a,5,5a,6,9,9a,10,10a-dodecahydro-1,4,5,10,6,9-trimethanoanthracene is recovered.

The chloro-substituted trimethanoanthracene epoxide prepared according to the above paragraph and polymethacrylic acid are admixed and treated in a manner similar to that hereinbefore set forth in the above examples. Upon completion of the desired curing time, the finished composition of matter is subjected to heat resistance and color stability tests. The results of these tests will be similar in nature to those found in the above examples.

EXAMPLE VII

A halo-substituted polycyclic epoxide comprising 2-epoxyethyl-5,6,7,8,9,9-hexachloro - 1,2,3,4,4a,5,8,8a-octahydro-1,4,5,8-dimethanonaphthalene which is prepared by admixing 5 - epoxyethyl-2-norbornene with hexachlorocyclopentadiene according to the method set forth in Example I above and a polymeric composition of matter comprising a co-polymer of maleic anhydride and vinyl acetate are treated in a manner similar to that set forth in the above examples, that is, by admixing the two compounds utilizing a xylene solvent and heating the mixture until a homogeneous mixture is obtained. The resulting composition of matter is poured into glass molds and cured at a temperature of about 100° C. for a period of about 6 hours. At the end of this time, the desired composition of matter comprising the reaction product of the co-polymer and the halo-substituted polycyclic epoxide is subjected to flame resistance and color stability tests. The novel composition of matter will exhibit excellent flame retardant and color stable properties.

EXAMPLE VIII

In this example a halo-substituted polycyclic epoxide comprising 2 - epoxyethyl-5,6,7,8,9,9-hexachloro-1,2,3,4,-4a,5,8,8a-octahydro-5,8-methanonaphthalene which is prepared by condensing 4 - epoxyethyl-1-cyclohexene with hexachlorocyclopentadiene is admixed with a polymeric compound containing at least one active hydrogen atom, said compound comprising a co-polymer of acrylic acid and vinyl chloride. The mixture is dissolved in xylene and heated until a homogeneous mixture is obtained. Following this, the xylene is removed and the mixture is poured into glass molds where it is cured for a period of 6 hours at a temperature of 100° C. Upon release from the molds, the cured mixture is subjected to a flame-retardant test which will disclose the ability of the finished composition of matter to retard the advance of a flame to a greater degree than will be exhibited by a co-polymer of acrylic acid and vinyl chloride alone.

Other finished compositions of matter comprising the reaction product are a polymeric ethyleneamine and 5-epoxyethyl-1,2,3,4,7,7-hexachloro-2-norbornene as well as other reaction products, and will also exhibit greater flame retardant or fire resistant properties than will polymers which do not contain the halo-substituted polycyclic epoxide reactant.

I claim as my invention:

1. Reaction product of a polymeric compound which contains at least one active hydrogen atom and a halo-substituted polycyclic epoxide, said epoxide being reacted with said polymeric compound in an amount of from about 5% to about 50% by weight of the finished product at a temperature of about 100° to 250° C., and said epoxide being the condensation product of from 1 to 3 molecular proportions of a conjugated aliphatic or cyclic diene with one molecular proportion of a 1,2-epoxide at a temperature of about 50° to 250° C.

2. The reaction product of claim 1 in which the polymeric compound which contains at least one active hydrogen atom is a polymer or co-polymer of the acrylic acid series.

3. The reaction product of claim 1 in which the polymeric compound which contains at least one active hydrogen atom is a co-polymer of a member of the acrylic acid series and a vinyl monomer selected from the group consisting of vinyl esters, vinyl ethers, vinyl chloride and styrene.

4. The reaction product of claim 1 in which the polymeric compound which contains at least one active hydrogen atom is a copolymer of a member of the acrylic acid series and an alkadiene.

5. The reaction product of claim 1 in which the polymeric compound which contains at least one active hydrogen atom is a copolymer of an unsaturated dicarboxylic acid or anhydride thereof and a vinyl ester.

6. The reaction product of claim 1 in which the polymeric compound which contains at least one active hydrogen atom is a copymer of maleic anhydride and an alkadiene.

7. The reaction product of claim 1 in which the halogen substituent of said polycyclic epoxide is chlorine.

8. The reaction product of claim 1 in which the halo-substituted polycyclic epoxide is 5-epoxyethyl-1,2,3,4,7,7-hexachloro-2-norbornene.

9. The reaction product of claim 1 in which the halo-substituted polycyclic epoxide is 2-epoxyethyl-5,6,7,8,9,9-hexachloro - 1,2,3,4,4a,5,8,8a - octahydro-1,4,5,8-dimethanonaphthalene.

10. The reaction product of claim 1 in which the halo-substituted polycyclic epoxide is 2-epoxyethyl-5,6,8,9,11,11 - hexachloro - 1,2,3,4,4a,5,5a,6,9,9a,10,10a-dodecahydro-1,4,5,10,6,9-trimethanoanthracene.

11. The reaction product of claim 1 in which the polymeric compound which contains at least one active hydrogen atom is polyacrylic acid.

12. The reaction product of claim 1 in which the polymeric compound which contains at least one active hydrogen atom is polymethacrylic acid.

13. The reaction product of claim 1 in which the polymeric compound which contains at least one active hydrogen atom is a co-polymer of maleic anhydride and vinyl acetate.

14. The reaction product of claim 1 in which the polymeric compound which contains at least one active hydrogen atom is a co-polymer of acrylic acid and vinyl chloride.

References Cited

UNITED STATES PATENTS 3,228,920   1/1966   D'Alelio.

HARRY WONG, JR., Primary Examiner

U.S. Cl. X.R.

260—13, 30.4, 45.8, 78, 80, 80.3, 82.1, 85.7, 87.5, 88.1, 91.3